Nov. 28, 1950 E. S. McLARN 2,531,457

PUSH-BUTTON SWITCH ARRANGED IN MULTIPLE ROWS

Filed Nov. 13, 1946 3 Sheets-Sheet 1

INVENTOR.
ERNEST S. McLARN
BY
Robert Harding Jr.
ATTORNEY.

Nov. 28, 1950 E. S. McLARN 2,531,457

PUSH-BUTTON SWITCH ARRANGED IN MULTIPLE ROWS

Filed Nov. 13, 1946 3 Sheets-Sheet 2

INVENTOR.
ERNEST S. McLARN

BY

Robert Harding Jr.

ATTORNEY.

PUSH-BUTTON SWITCH ARRANGED IN MULTIPLE ROWS

Filed Nov. 13, 1946

3 Sheets-Sheet 3

INVENTOR.
ERNEST S. McLARN

BY Robert Harding Jr.
ATTORNEY.

Patented Nov. 28, 1950

2,531,457

UNITED STATES PATENT OFFICE 2,531,457

PUSH-BUTTON SWITCH ARRANGED IN MULTIPLE ROWS

Ernest S. McLarn, Manhasset, N. Y., assignor to International Standard Electric Corporation, New York, N. Y., a corporation of Delaware Application November 13, 1946, Serial No. 709,668

11 Claims. (Cl. 179—99)

The present invention relates to means for interlocking keys applicable particularly, but not exclusively, to a subscriber's telephone equipment.

It has been proposed heretofore to provide a subscriber's telephone set with manually operable keys individually assigned to certain telephone lines whereby operation of any key will effect connection of said telephone set to the corresponding line of said telephone lines. Each of said keys when operated may be held in operated position until released in some suitable manner. It is also important to provide interlocking means whereby full depression of any two keys at the same time will be prevented and full depression of any key will restore any other depressed key to normal position.

It has also been proposed heretofore in some key-controlled multiple-switch devices to meet this requirement by providing beneath parts of keys arranged in a row, a flexible band supported at each side of each key and fixed at its ends and providing enough slack to permit full depression of one key at a time.

An important object of the invention is to provide novel and advantageous apparatus of the general character described.

Another object of the invention is to provide apparatus of the general character described including novel and advantageous means for controlling the operation of a plurality of depressible keys for various purposes, including that of preventing the full depression and latching in depressed position, of more than one key at a time.

According to one way of carrying out the invention as applied to a subscriber's telephone set there is a row of spring supported keys or push buttons each of which when fully depressed will close certain switches and will be yieldingly latched in depressed position. Beneath said keys is a flexible band passing through guides located between successive keys and holding the band against upward or downward movement at said guides. Said band is secured at its ends so as to provide just enough slack to permit full depression of one key at a time. When the apparatus is not in use, and all keys are in raised position, the slack is taken up by one arm of a yieldable lever of which the other is pressed down by the support or cradle for the receiver or hand set.

The arms of said lever are limited by structure as to outward movement and are urged outwardly to their limiting positions by a spring device which is not strong enough to lift the receiver or hand set when a key is accidentally depressed, but is strong enough to restore the key to raised position, even against the action of the spring latch for holding the key depressed.

The key-controlling apparatus may be modified for use where keys are arranged in a plurality of rows.

In some forms of apparatus, the tautness of the band under the keys when the apparatus is not in use, might be maintained by means other than a receiver or a hand set resting on a corresponding support.

Other objects, features and advantages will appear upon consideration of the following detailed description and of the drawings, in which Fig. 1 is a fragmentary front elevation of one embodiment of the invention, partially broken away to show underlying structure, with no key depressed and hand set in place on the cradle;

Figure 1:
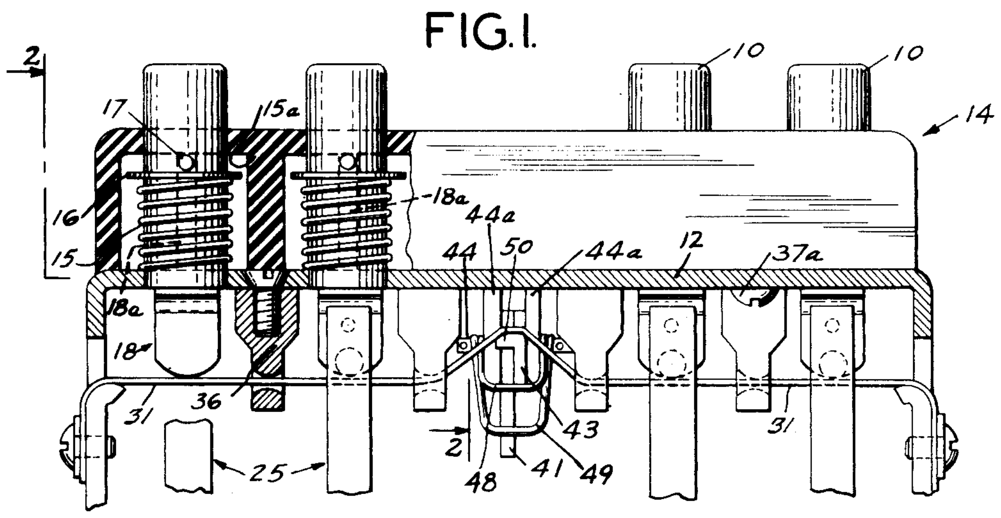
Figure 2:
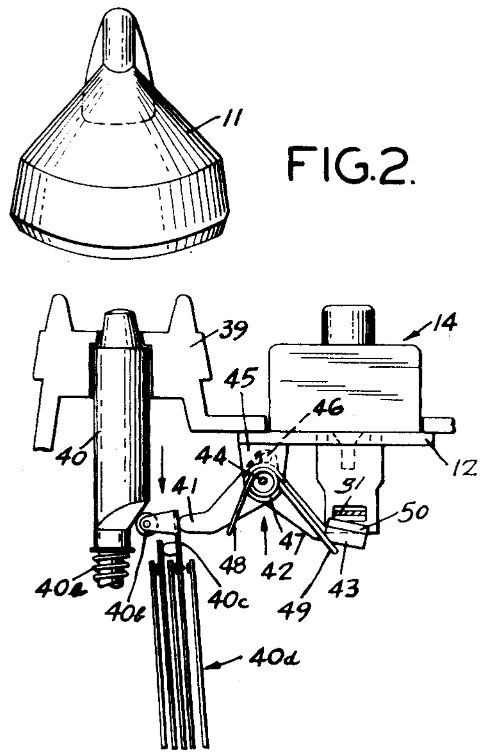
Fig. 2 is a section taken along the line 2—2 of Fig. 1, certain parts being broken away; and hand set off cradle.
Figure 3:
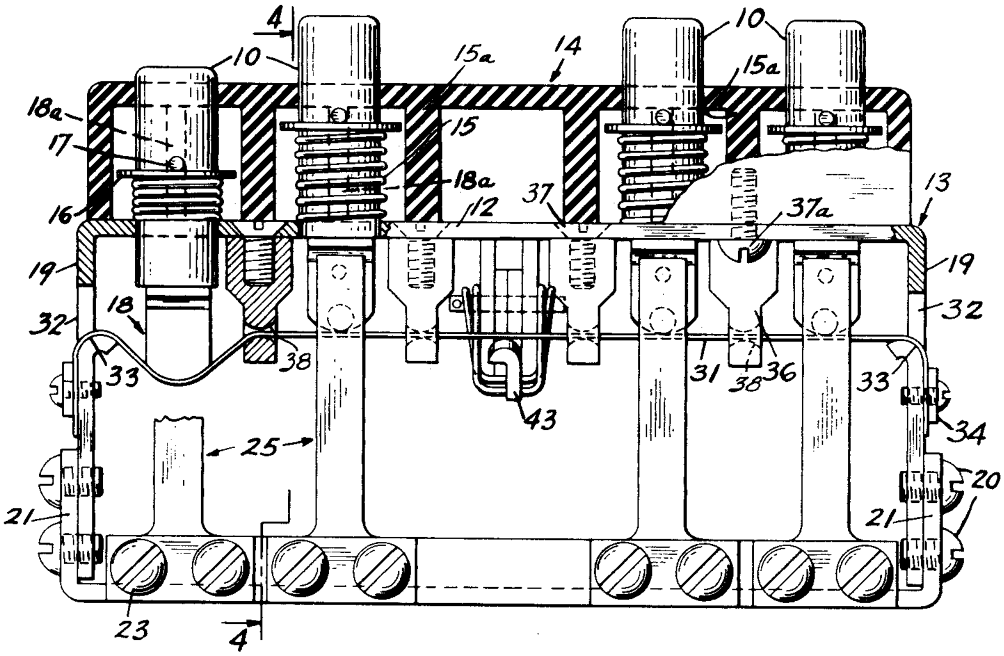
Fig. 3 is a view looking in the same direction as in Fig. 1 (but with one key shown locked in depressed position), certain parts being in section and other parts being broken away; hand set is off cradle.

Referring to the drawings, Figs. 1, 2, 3, and 4 illustrate a subscriber's station of an inter-communication system wherein there is a single row of keys or push buttons 10, preferably of molded insulating material, and depression of any one of these push buttons will connect a hand set 11 (Fig. 2) to a corresponding line connected to said subscriber's station, if other conditions are met. Said push buttons 10 are in the form of plungers of any suitable cross-section with their lower ends slidably mounted in corresponding openings in a metal plate 12 constituting the top of a frame 13.

The upper parts of said push buttons or plungers 10 are slidably mounted in corresponding openings in the top of a cover 14 of suitable insulating material such as molded plastic or the like, and provided with reinforcing partitions 15a between the push buttons. Each push button 10 is urged upwardly by a helical spring 15 interposed between plate 12 and a washer 16 which is held against a pin 17 passing through the plunger. Upward movement of the plunger is limited by engagement of the pin 17 with the top of the cover 14 and/or by engagement of the lower face of the plate 12 by the foot or contact spreader 18 of the plunger or push button 10. Buttons 10 are held against rotation by the engagement of pins 17 in slots 13a in cover 14.

Figure 4:
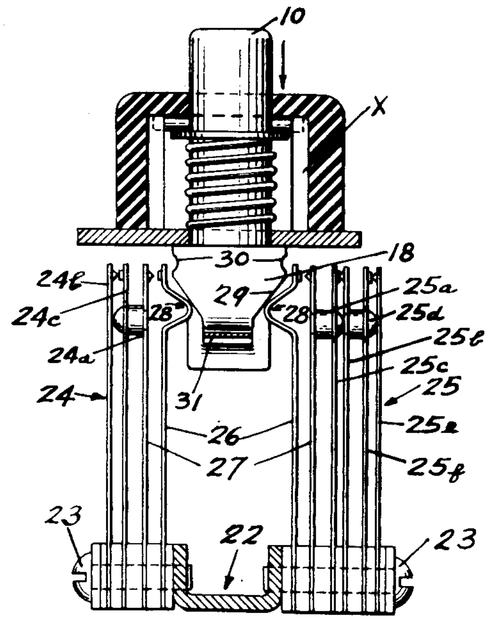
Fig. 4 is a section taken along the line 4—4 of Fig. 3.

The frame 13 has ends 19 which are illustrated as integral with plate 12 and extending downwardly at right angles thereto. The lower parts of the frame ends 19 are fastened by suitable means such as screws 20 to upturned ends 21 of the bottom of a channel 22 to the sides of which are attached as by screws 23 the lower ends of spring assemblies 24 and 25 (Fig. 4). The springs of said pile-ups are, of course, insulated from each other. Depression of a plunger 10 is utilized to effect spreading of inner springs 26 into contact with adjacent springs 27 and locking of the plunger 10 in its lowermost or depressed position. To this end, springs 26 are bent, below their upper ends, to provide inward projections 28, and the foot 18 of the plunger is formed with upwardly spreading sides 29 (Fig. 4) to engage and separate projections 28, and above said sides 28 with recesses 30 to receive said projections 28 and lock the push button or plunger in depressed position. Depression of the push button or plunger 10 presses the springs 26 and 27 of spring pile assembly 24, moves the left hand portion of spring 27 thereof to the left, and through an insulating button or member 24a thereon moves a contact spring 24b out of contact with a spring 24c. In the same manner the right hand portion of spring 27 of spring assembly 25 acts through an insulating button 25a to separate a spring 25b from a spring 25c and through an insulating button 25d to move spring 25e out of contact with spring 25f. At the same time the right and left hand portions of springs 26 and 27 are brought into contact.

In providing key control and interlocking, use is made of an inextensible flexible band 31, preferably in the form of a metal tape extending beneath the lower ends of all of said push buttons 10. The ends of said tape extend outwardly through openings 32 and over curved-surface supports 33 formed by curving inwardly the material of ends 19 at the lower edges of said openings 32. The tape is clamped between ends 19 and plates 34 by means such as screws 35. The ribbon or tape 31 may be made of various materials so long as it has sufficient strength, flexibility and non-elasticity. Use might be made of a bronze tape, a metal braided ribbon or tape or a fabric treated with rubber or plastic.

If stretched between said supports 33, the flexible band or ribbon 31 will be substantially in contact with the bottom faces of the plungers 10 in raised positions. These bottom faces are straight from front to rear of Figs. 1 and 3, as indicated in Fig. 4 and are curved from side to side of Figs. 1 and 3 so that the tape 31 may wind around the same without being bent over any sharp edges. Arranged at regular intervals (Fig. 3) between the frame ends 19, are four tape guides 36 projecting downwardly from plate 12 and attached thereto by suitable means as screws 37. The partition 15a of the cover 14 are directly over the guides 36 and the cover is secured to the plate 12 by screws 37a. Near the lower ends of guides 36 are guide passages 38 for the tape 31, with curved tops and bottoms to avoid sharp bends in the tape. The low central parts of said passages hold the corresponding portions of the tape at the same level as the curved surfaces or guides 33.

There is just enough slack in the tape 31 between the frame ends 19, so that full depression of any one key will prevent depression of any other key. However, in the apparatus of the present invention, there is further control effected by placing the receiver or hand set 11 on or removing it from a support or cradle 39 in which is mounted an upwardly and downwardly movable member or plunger 40 pressed upwardly by a spring 40a. An inclined or cam surface on one side of plunger 40 engages a roller 40b carried by a spring 40c of a spring assembly 40d. As seen from Fig. 2 the upward movement of plunger 40 effects the closing of the left hand contacts of assembly 40d by spring 40c and the downward movement of plunger 40, the opening of these contacts and the closing of the right hand contacts of the assembly. Spring 40c engages an arm 41 of a lever 42 which also includes a second arm 43 yieldably connected to the first arm 42. The inner ends of these arms are pivotally mounted side by side on a pin 44 supported by two lugs 44a extending downwardly from plate 12. Upward movement of the two arms is limited by engagement of a lug 45 on arm 41 by a pin 46 extending laterally into the path of lug 45, and the two arms are urged to such limiting positions by a spring 47 wound around said pin and having parts here shown as loops 48 and 49, engaging said arms from below.

The arm 43 is provided with an off-turned forward end 50 having a curved upper surface to engage the lower side of the tape and prevent bending of the tape over a sharp edge. When the hand set 11 is on the cradle and no key is depressed, the slack in the tape 31 will be taken up by the arm 43 as shown in Fig. 1. The spring 47 is not strong enough to lift the hand set 11 through the cradle 39. Under these circumstances any one of said keys may be depressed, accidentally or otherwise, and pull down the lever arm 43, so that the projections 28 will engage in said recesses or notches 30 (Fig. 4). Of course, no other key could be depressed at the same time. However, the spring 47 is strong enough to restore the depressed key 10 to its normal or unoperated position.

When it is found desirable to use the hand set or receiver 11, it may be lifted from the support or cradle 39. This will release the lever 42 and enable it to take its Fig. 2 position and shift the springs of the spring assembly 40d accordingly from positions wherein spring 40c is in contact with the right hand spring of the spring assembly 40d and all contacts to the left of spring 40c are broken. Then the depression of any one of said keys, for example the left in Fig. 3, will prevent the depression of any other keys of said set.

The operation of the apparatus will now be reviewed. Depression of a key 10 should be effected only when the hand set 11 has been removed from the support or cradle 39, leaving the parts in the general condition shown in Fig. 3. Then a selected key 10 may be depressed to effect connection with a desired line and the key will be latched in depressed position by engagement of projections 28 of springs 29 in recesses 30. The tape 31 and the cooperating parts prevent the depression of two keys at the same time.

If it be desired merely to disconnect a line in use, the desired result may be obtained by partially depressing any non-operated button, by restoring the hand set to the support or cradle thereof or by depressing the support by hand. If it be desired to change connection from one line to another, this result is achieved merely by depressing the proper key which would restore to normal position the key previously depressed.

It is not intended to depress a key while the hand set is on the cradle. However, if a key be depressed at this time either accidentally or intentionally, the spring 47 would yield without lifting the hand set and as soon as the pressure on the key is removed, it will be rturned to its normal position.

Up to this point the invention has been described only with reference to a single row of keys. However, the invention can be applied to a modified apparatus having a plurality of rows of keys, a form having two rows of keys being illustrated in Figs. 5 through 8 wherein parts connected with the first row of keys are designated by the same numerals as in Figs. 1 through 4 but with the subscript *a* associated therewith, and the corresponding parts connected with the second row are designated by the same numerals but with the subscript *b*.

Figures 5, 6:
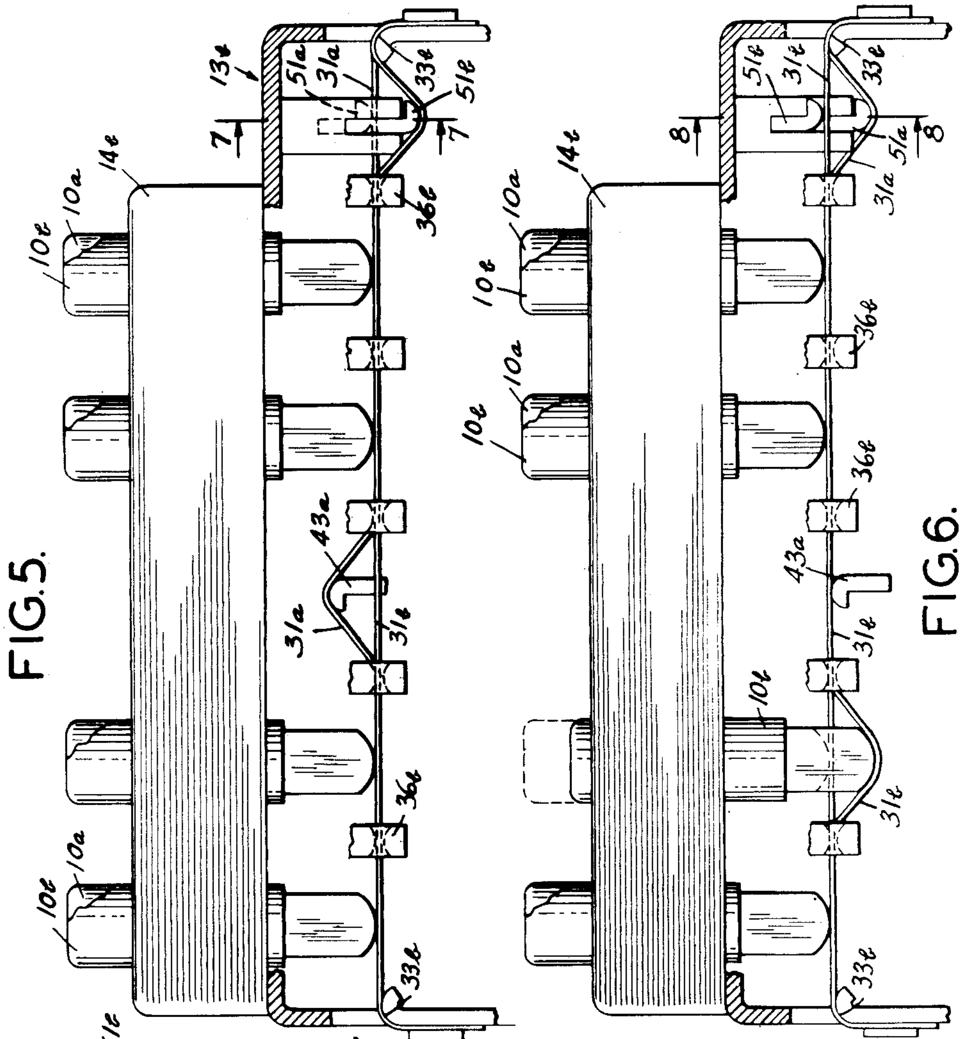
Fig. 5 is a diagrammatic view illustrating an arrangement wherein two rows of keys are used and the receiver or hand set is on its support or cradle.
Fig. 6 is a view similar to Fig. 5, but with the receiver off the support and one key of the second set depressed.
Figure 7:
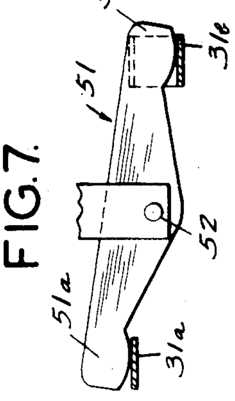
Fig. 7 is a fragmentary sectional view taken along the line 7—7 of Fig. 5.
Figure 8:
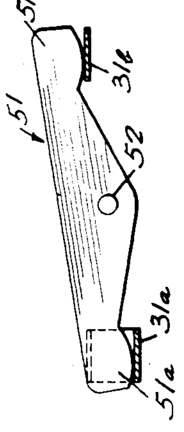
Fig. 8 is a fragmentary sectional view taken along the line 8—8 of Fig. 6.

In Fig. 5, keys **10*b* of the second row are to the front, parts of these keys being broken away to show parts of keys 10*a* of the first set to the rear thereof. In order that the taking up of slack in either of the tapes 31*a* and 31*b* may cause the taking up of slack in the other, the frame 13*b* is extended to the right and a tape guide 36*b* provided to the right of the right-hand plunger 10*b*. Midway between the right-hand tape guide 36*b* and the curved top support 33*b*, the tape 31*b* underlies the transversely curved lower face of the corresponding end 51*b* of a lever 51 mounted midway of its ends on a horizontal pivot 52 and at the other end 51*a* the tape 31*a* also underlies the lever, as indicated clearly in Figs. 7 and 8. When the lever arm 43 is in raised position (Fig. 5), the tape 31*a* is horizontal at all other points. The lever end 51*a* is then in raised position and the lever end 51*b* is in lowered position, thus making a bend in tape 31*b* and drawing the rest of the tape 31*b* into a straight line to prevent depression of any key 10*b*. The same effect would be produced if the arm 43 were in its Fig. 6 position and one of the keys or buttons 10*a*** were depressed.

If one of the keys **10*b* be depressed to force the tape 31*b* down at that position (Fig. 6), the rest of the tape would be drawn straight and end 51*b* of lever 51 would be raised. This would cause end 51*a* to be depressed and tape 31*a* to be depressed at that point, and the rest of tape 31*a* to be drawn tight, thus preventing depression of any key 10*a*. If the receiver or hand set, whichever it may be, be placed on the hook, any key 10*a* or 10*b*** may be operated against spring action, and when released from pressure from above, would immediately be restored to its upper or normal position.

Obviously, the means for controlling the operation of each of the tapes **31*a* and 31*b*** from the other, might be provided in other forms. For example, this might be done by using a lever pivoted about a vertical axis and having its ends attached to the right hand ends of said tapes. With this arrangement, each end of the lever would move about twice as far as with the other arrangement.

It will be evident that the present invention may be used to very great advantage, especially in certain telephone installations.

It should be understood that various changes may be made and certain features may be used without others, without departing from the true spirit and scope of the invention.

I claim:

1. In a multiple switch device, a row of spring-supported push buttons, switches individual thereto and operated by depressing the corresponding push buttons, an inextensible tape beneath the lower ends of said push buttons, means to maintain said tape at a uniform level at opposite sides of each push button, means for holding the ends of said tape with enough slack therebetween to permit full switch operating depression of one button at a time, said tape being operatively positioned after full depression of any one of said push buttons to return said push button to an unoperated position by partially depressing any nonoperated button.

2. The combination according to claim 1 wherein each switch comprises at opposite sides of the tape upright contact springs formed with inward projections near their upper ends, and the corresponding push button has a foot provided with a lower face straight in a direction across the tape to cooperate therewith, outwardly and upwardly inclined faces to engage said projections and cam them outwardly, and recesses above said inclined faces to receive said inward projections and yieldably latch the push button in depressed position.

3. The combination according to claim 1 wherein there is a spring device settable to engage said tape and take up the slack when the push buttons are raised or settable to ineffective condition, and means to yieldingly latch a fully depressed push button in that position, said means to yieldably latch a push button operative to be overcome by said spring device when the latter is set to take up the slack.

4. The combination according to claim 1 wherein each push button and the switch operated thereby have cooperating means for yieldably latching the push button in depressed position.

5. In a multiple switch device, a plurality of rows of push buttons and means for yieldably holding them in their idle outward positions, switches individual to said push buttons, inextensible tapes individual to said rows and extending beneath the lower ends of the push buttons therein means to maintain each tape at a uniform level at opposite sides of each push button in the corresponding row, means for holding the ends of each tape with enough slack to permit full switch-operating depression of any one push button at a time, means interposed between each tape and the tape of another row to transmit motion therebetween and by full depression of any one push button in any of said rows prevent full depression of any other push button therein and means controllable by any of said push buttons to return all said push buttons to an unoperated position.

6. The combination according to claim 5 including yieldable means to latch each push button in depressed position, and additional means acting on one of said tapes to restore a depressed push button associated with any of said tapes.

7. The combination according to claim 5 with spring means settable to ineffective condition and to effective condition to exert tension on one of said tapes, said spring means yielding to sufficient pressure to permit depression of any one of said push buttons but acting when said pressure is relieved to restore the depressed push button to its normal position.

8. In a telephone subscriber's intercommunication system, a row of switches to establish connection with individual telephones, a row of spring-supported push buttons individual to said switches and adapted when depressed to close the switches, said push buttons and corresponding switches having cooperating means for yieldably latching a depressed push button, an inextensible tape beneath said push buttons, tape guides at opposite sides of each of said push buttons, means for holding the ends of said tape leaving sufficient slack to permit depression of one push button at a time, an instrument including a receiver, a member depressed by placing said instrument thereon and rising when said instrument is removed, and yielding means rendered effective by placing said instrument on said support for tensioning said tape to hold said push buttons yieldably in raised positions or to release any push button latched in depressed position and restore it to its normal position.

9. The combination according to claim 8 wherein said yielding means is a yieldable lever of which one arm is urged downwardly by said instrument and the other engages the tape to tension the same.

10. The combination according to claim 8 wherein said yielding means is a yieldable lever one arm of which is pressed downwardly by said instrument and the other of which presses upwardly on the tape to tension the same, the arms being limited as to upward movement and being urged in that direction by a spring to tension the tape, said spring being of sufficient strength to overcome said yieldable latching means.

11. In a multiple switch device, two rows of switches, two rows of spring-supported push buttons individual to said switches for operating the same, and means to prevent full depression of more than one of said push buttons at a time including an inextensible tape under the push buttons of each of said rows and means for transmitting tension from one of said tapes to the other.

ERNEST S. McLARN.

REFERENCES CITED

The following references are of record in the file of this patent:

UNITED STATES PATENTS

| Number | Name | Date |
|---|---|---|
| 570,812 | McConnell | Nov. 3, 1896 |
| 701,282 | Bassett | June 3, 1902 |
| 931,331 | McQuarrie | Aug. 17, 1909 |
| 984,686 | Manson | Feb. 21, 1911 |
| 1,333,596 | Andrick | Mar. 16, 1920 |
| 2,248,539 | Shaw | July 8, 1941 |
| 2,320,774 | Flynt | June 1, 1943 |
| 2,338,757 | Curran | Jan. 11, 1944 |